(No Model.)

F. ARMSTRONG.
LATHE DOG.

No. 295,713. Patented Mar. 25, 1884.

Witnesses:
T. C. Brecht
F. L. Burne

Inventor:
Frank Armstrong
By Wm. C. McIntire
Attorney.

UNITED STATES PATENT OFFICE.

FRANK ARMSTRONG, OF BRIDGEPORT, CONNECTICUT.

LATHE-DOG.

SPECIFICATION forming part of Letters Patent No. 295,713, dated March 25, 1884.

Application filed June 21, 1883. (No model.)

*To all whom it may concern:*

Be it known that I, FRANK ARMSTRONG, a citizen of the United States, residing at Bridgeport, Connecticut, have invented new and useful Improvements in Lathe-Dogs, of which the following is a specification.

My invention relates to certain new and useful improvements in lathe-dogs. It has for its objects to provide a dog which shall be simple and durable in construction, and which shall grasp the work with great tenacity and security against any accidental displacement of the same; and with these ends in view my invention consists of the peculiarities of construction hereinafter fully set forth, and specifically claimed.

In order that those skilled in the art to which my invention pertains may fully understand the same, I will proceed to describe its construction and operation, referring by letters to the accompanying drawings, in which—

Figure 1:
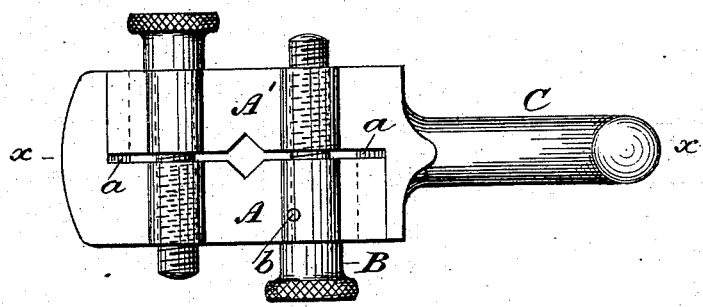
Figure 2:
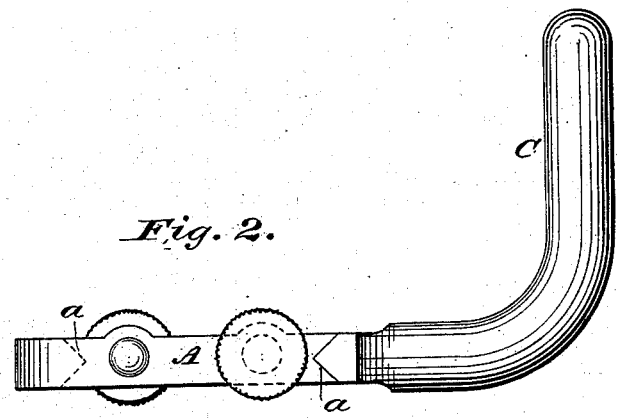
Figure 3:
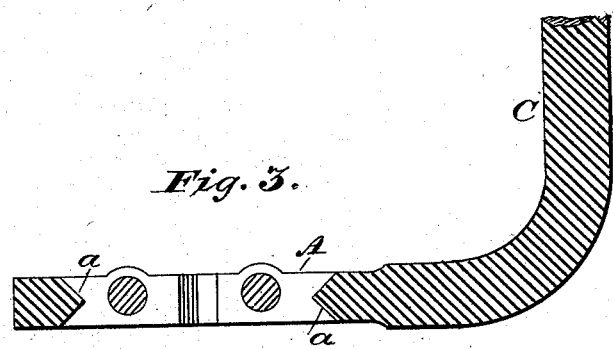

Figure 1 is a plan view of a lathe-dog embodying my invention. Fig. 2 is a side or edge elevation, and Fig. 3 a longitudinal section taken at the line x x of Fig. 1.

Similar letters indicate like parts in the several figures.

A A' represent the two jaws of the dog, each provided with heel and toe V-shaped bearings or guide-surfaces, as seen at a a, and adapted to be drawn toward or forced from each other by a screw, B, passing through the jaw A loosely, and working in a female thread in the jaw A', as clearly illustrated at Fig. 1, that portion of the screw lying within the jaw A being unthreaded, as illustrated by dotted lines. The screw B is provided with a circumferential groove, through which and the jaw A is passed a pin, b, so that the rotation of the screw will cause the movement to and fro of the jaw A'. An auxiliary screw, B', passes through the jaws from the opposite side, similarly to the screw B, but without the groove and pin, and serves as a means for strengthening the grip by running up said screw after the jaws have been adjusted by the screw B. The heel and toe V-shaped bearings a at each end of the jaws A A' not only serve as guides in directing the movement of the jaws toward and from each other, but when the dog is in use they relieve the screws B B' from all distortion or strain which occurs in dogs as at present constructed. One of the jaws is provided with an arm or handle, C, turned up at right angles, for the obvious purpose of holding the dog against rotation independent of the lathe.

What I claim as new, and desire to secure by Letters Patent, is—

A lathe-dog composed of the two jaws A A', provided with the screws B B' and pin b, and formed with V-shaped guides or bearings a at either end, whereby the jaws are guided in their movements and the binding-screws are relieved from strain, substantially as hereinbefore set forth.

In testimony whereof I have hereunto set my hand in the presence of two subscribing witnesses.

FRANK ARMSTRONG.

Witnesses:
 NATHANIEL W. VANDEGRIFT,
 G. A. STAPLES.